(12) United States Patent
Liu et al.

(10) Patent No.: US 12,104,802 B2
(45) Date of Patent: Oct. 1, 2024

(54) OPERATION CONTROL PANEL PUSH-PULL MECHANISM AND STEAMING-ROASTING ELECTRIC APPLIANCE

(71) Applicant: Gree Electric Appliances, Inc. of Zhuhai, Guangdong (CN)

(72) Inventors: Jinhui Liu, Guangdong (CN); Xingqiang Chen, Guangdong (CN); Kezhen Wang, Guangdong (CN); Shaotang Liang, Guangdong (CN); Dawei Wang, Guangdong (CN); Guoqiang Yu, Guangdong (CN)

(73) Assignee: Gree Electric Appliances, Inc. of Zhuhai, Zhuhai (CN)

( * ) Notice: Subject to any disclaimer, the term of this patent is extended or adjusted under 35 U.S.C. 154(b) by 731 days.

(21) Appl. No.: 17/287,073

(22) PCT Filed: Aug. 6, 2019

(86) PCT No.: PCT/CN2019/099428
§ 371 (c)(1),
(2) Date: Apr. 20, 2021

(87) PCT Pub. No.: WO2020/082854
PCT Pub. Date: Apr. 30, 2020

(65) Prior Publication Data
US 2021/0356135 A1 Nov. 18, 2021

(30) Foreign Application Priority Data
Oct. 22, 2018 (CN) .......................... 201811228145.1

(51) Int. Cl.
*F24C 7/08* (2006.01)
*A47J 27/04* (2006.01)
*A47J 37/06* (2006.01)

(52) U.S. Cl.
CPC ............... *F24C 7/082* (2013.01); *A47J 27/04* (2013.01); *A47J 37/0664* (2013.01); *A47J 2027/043* (2013.01)

(58) Field of Classification Search
CPC .. A47J 2027/043; A47J 27/04; A47J 37/0664; F24C 15/003; F24C 15/327;
(Continued)

(56) References Cited

U.S. PATENT DOCUMENTS

2010/0206414 A1* 8/2010 Adamczak ............ F24C 15/327
137/800
2016/0235239 A1 8/2016 Patadia
2018/0328591 A1* 11/2018 Eggers .................. F24C 15/105

FOREIGN PATENT DOCUMENTS

CN  203782488 U  8/2014
CN  205053739 U  3/2016
(Continued)

OTHER PUBLICATIONS

International Search Report, with a mailing date of Oct. 31, 2019, in International application No. PCT/CN2019/099428, filed on Aug. 6, 2019.
(Continued)

*Primary Examiner* — Sang Y Paik
*Assistant Examiner* — Bonita Khlok
(74) *Attorney, Agent, or Firm* — McAndrews, Held & Malloy, Ltd.

(57) ABSTRACT

An operation control panel push-pull mechanism and a steam-roasting electric appliance are provided. The operation control panel push-pull mechanism is capable of driving an operation control panel of an electric appliance to move between a first position and a second position, and includes a driving part, a fitting part and a first pushing part; the fitting part is fixed relative to a body of the steam-roasting electric (Continued)

appliance, the first pushing part is rotatably connected with the driving part and fixedly connected with the operation control panel, a rail structure is provided on the first pushing part, the fitting part cooperates with the rail structure, and the driving part is capable of driving the first pushing part to drive the operation control panel to move between the first position and the second position.

14 Claims, 5 Drawing Sheets

(58) Field of Classification Search
CPC .. F24C 7/082; F24C 13/00; F24C 7/08; F24C 7/081; F24C 7/083; F24C 7/085; F24C 7/086; F24C 14/005; A21B 3/04; A21B 1/24; F24H 1/12; F24H 1/122
USPC .............. 219/401, 682, 731; 99/357; 126/20
See application file for complete search history.

(56) References Cited

FOREIGN PATENT DOCUMENTS

| | | |
|---|---|---|
| CN | 105455660 A | 4/2016 |
| CN | 105476458 A | 4/2016 |
| CN | 207575013 U | 7/2018 |
| CN | 109303490 A | 2/2019 |
| CN | 209661365 U | 11/2019 |
| DE | 102012224033 A1 | 6/2014 |
| EP | 1795642 A1 | 6/2007 |
| EP | 2466214 A1 | 6/2012 |
| JP | 2007298246 A | 11/2007 |
| WO | 2017128931 A1 | 8/2017 |

OTHER PUBLICATIONS

The European search report for Application No. 19876957.2, dated Nov. 19, 2021, European Patent Office, Germany (8 pages).

* cited by examiner

OPERATION CONTROL PANEL PUSH-PULL MECHANISM AND STEAMING-ROASTING ELECTRIC APPLIANCE

CROSS-REFERENCE TO RELATED APPLICATION

The present disclosure is a 371 of International Patent Application No. PCT/CN2019/099428, filed Aug. 6, 2019, which claims the priority of a Chinese Patent Application filed on Oct. 22, 2018, with the No. 201811228145.1, and entitled "Operation Control Panel Push-pull Mechanism and Steaming-Roasting Electric Appliance", which is incorporated herein by reference in its entirety.

TECHNICAL FIELD

The present disclosure relates to a technical field of electric appliances, and in particular to an operation control panel push-pull mechanism and steaming-roasting electric appliance.

BACKGROUND

In steaming-roasting appliances, water is required as a main cooking medium, so that a water tank is required to be provided on such appliances. However, for a steaming electric appliance known to the inventors, a water tank is generally provided at the side of a heating cavity in a main body of a steaming-roasting electric appliance, and such a design greatly compresses the heating space of the cavity. At the same time, during cooking, when water needs to be added, the user needs to open the cabinet door to take out the water tank, which causes interruption of cooking and loss of steam, and greatly affects the user experience.

Currently, there are many household appliances in which a water tank is provided above a cavity and is located at the rear of a display panel, and when water needs to be added, the display panel is turned over to expose the water tank, so that the user can take out the water tank for water addition. However, the upturning mechanism needs to be designed with a fixed support and a long connecting rod, which greatly occupies the space of the rear of the display panel and the upper portion of the cavity, and occupies the space for other structures such as an air duct and a main board. Meanwhile, due to space limitation, the design space of the water tank is reduced, causing the number of times of adding water by the user to be increased, thereby affecting the experience.

SUMMARY

In view of this, the disclosure discloses an operation control panel push-pull mechanism and steaming-roasting electric appliance, for solving the problem of a large space occupied by the push-pull mechanism.

In order to solve the above problem, on one aspect, the disclosure uses the following technical solution:

a operation control panel push-pull mechanism, which is capable of driving an operation control panel of an electric appliance to move between a first position and a second position, wherein the operation control panel push-pull mechanism includes a driving part, a fitting part and a first pushing part, the driving part and the fitting part are fixed relative to a body of an electric appliance, the first pushing part is rotatably connected with the driving part, the first pushing part is fixedly connected with the operation control panel, a rail structure is provided on the first pushing part, the fitting part cooperates with the rail structure, and the driving part is capable of driving the first pushing part to drive the operation control panel to move between the first position and the second position.

In some embodiments, the rail structure includes a circular arc section, an inclined section and a horizontal section from a rear to a front, and when the operation control panel is in the second position, the inclined section inclines upwards from the rear to the front.

In some embodiments, the rail structure includes a rail groove, the fitting part includes a front roller assembly, the front roller assembly includes a front shaft and a front bearing sleeved on the front shaft, and the front bearing is located in the rail groove and is able to move along the rail groove.

In some embodiments, the operation control panel push-pull mechanism further includes a base, and the front shaft is fixed on the base.

In some embodiments, the first pushing part includes a push rod, a rear end of the push rod is rotatably connected with the driving part, and a front end of the push rod is fixedly connected with the operation control panel.

In some embodiments, the base is of a box-shaped structure, and a water tank is accommodated in the box-shaped structure.

In some embodiments, two push rods are provided, and the two push rods are respectively located on two sides of the box-shaped structure.

In some embodiments, the driving part includes a driving device and a second pushing part, the two push rods are both rotatably connected with the second pushing part, and the driving device drives the two push rods to move synchronously by the second pushing part.

In some embodiments, the driving device is installed on the base.

In some embodiments, an accommodating groove is provided in a middle of the box-shaped structure, and the driving device is provided in the accommodating groove.

In some embodiments, the second pushing part includes a pushing plate, the pushing plate includes an elongated plate part located above the box-shaped structure and two connection plate parts formed by bending two ends of the elongated plate part downwards, the elongated plate part is connected with the driving device, and the two connection plates are rotatably connected with the two push rods respectively.

In some embodiments, a guiding structure is provided on the base for guiding the movement of the rear end of the push rod.

In some embodiments, the guiding structure includes a sliding groove, the operation control panel push-pull mechanism further includes a rear roller assembly, the rear roller assembly includes a rear shaft and a rear bearing sleeved on the rear shaft, the rear shaft is fixedly connected with the driving part and rotatably connected with the rear end of the push rod, and the rear bearing is located in the sliding groove and is able to move along the sliding groove.

On the other aspect, the disclosure uses the following technical solution:

A steaming-roasting electronic appliance, including an operation control panel, a water tank, and the operation control panel push-pull mechanism mentioned above, wherein the operation control panel exposes the water tank when being in the first position and conceals the water tank to a rear side of the operation control panel when being in the second position.

In some embodiments, the steaming-roasting electronic appliance includes a steamer, or a roaster with steaming and roasting functions or a steam oven.

According to the operation control panel push-pull mechanism and the steaming-roasting electric appliance disclosed in the disclosure, the rail structure is provided on the first pushing part, thereby saving the space occupied by the push-pull mechanism, which enables a water tank to be designed larger, reduces the number of times of water addition, reduces the length of the first pushing part, and ensures the movement stability of the push-pull mechanism.

BRIEF DESCRIPTION OF THE DRAWINGS

The above and other aims, features and advantages of the present disclosure will be more apparent through the following description of the embodiments of the present disclosure with reference to the accompanying drawings, in which.

In the drawings.

1, operation control panel; 2, water tank; 3, driving part; 31, driving device; 32, second pushing part; 321, pushing plate; 3211, elongated plate part; 3212, connection plate part; 32121, groove; 4, fitting part; 41, front roller assembly; 411, front shaft; 412, front bearing; 5, first pushing part; 51, rail structure; 511, rail groove; 512, circular arc section; 513, inclined section; 514, horizontal section; 52, push rod; 521, hole; 6, base; 61, guiding structure; 611, sliding groove; 62, accommodating groove; 7, rear roller assembly; 71, rear shaft; 72; rear bearing.

DETAILED DESCRIPTION OF THE EMBODIMENTS

The disclosure is described below based on embodiments, and it should be understood by those of ordinary skill in the art that the figures provided herein are for purposes of illustration, and the figures are not necessarily drawn to scale.

Unless the context clearly requires, throughout the description and claims, the words "comprise" "comprising" and the like should be construed in an inclusive sense rather than an exclusive or exhaustive sense; that is to say, in the sense of "including, but not limited to."

In the description of the present disclosure, it should be understood that: the terms such as "first" and "second" on are only used for descriptive purposes, and cannot be construed as indicating or implying relative importance. In addition, in the description of the present disclosure, unless otherwise stated, "a plurality of" refers to two or more.

The orientation words such as "up" and "down" in the present disclosure refer to the orientation of institutions and electrical appliances when they are in normal working conditions.

Figure 1:
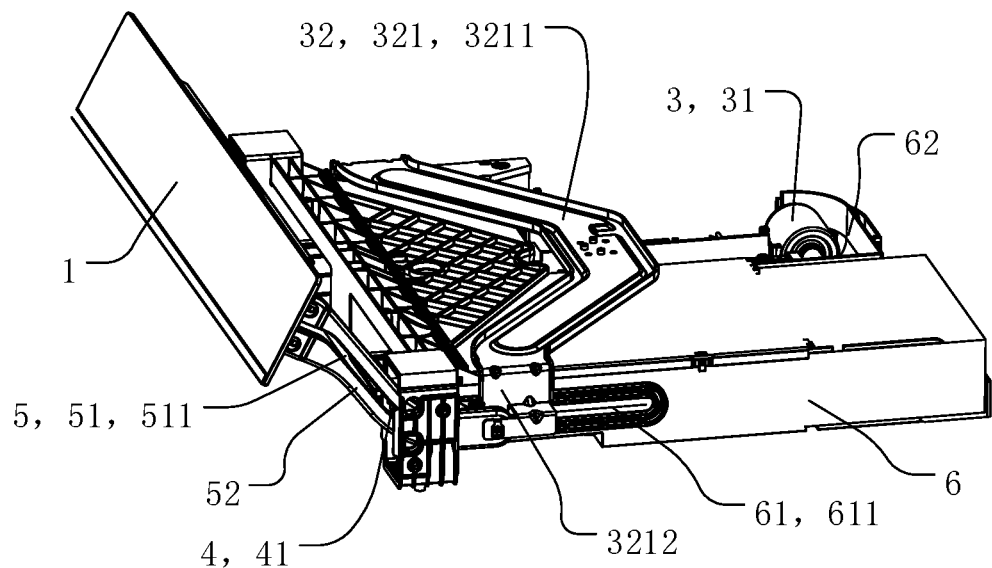
FIG. 1 is a schematic diagram of an operation control panel in a first position according to some embodiments of the present disclosure.
Figure 2:
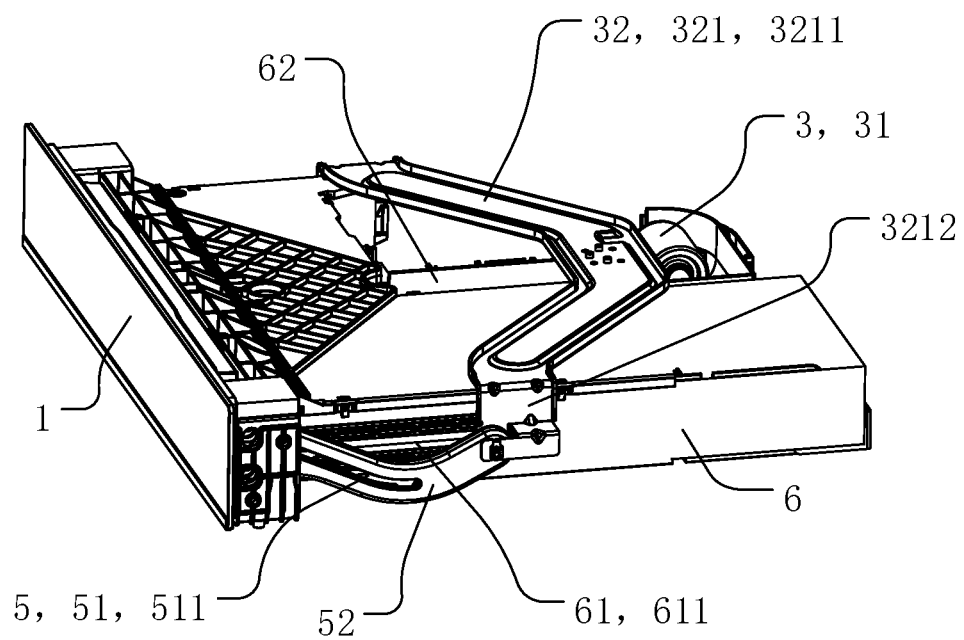
FIG. 2 is a schematic diagram of an operation control panel in a second position according to some embodiments of the present disclosure.

The disclosure provides an operation control panel push-pull mechanism, as shown in FIGS. 1 and 2, the operation control panel push-pull mechanism is capable of driving an operation control panel of an electric appliance to move, for example, when the mechanism is applied to a steaming-roasting electric appliance, the operation control panel 1 is controlled to move so as to expose a water tank 2 of the steaming-roasting electric appliance or hide the water tank 2 to a rear side of the operation control panel 1, specifically, when water needs to be added to the water tank 2 of the steaming-roasting electric appliance, the push-pull mechanism drives the operation control panel 1 to move to expose the water tank 2, facilitating the addition of water, and after the addition of water is completed, the push-pull mechanism drives the operation control panel 1 to move so that the water tank 2 is hidden to the rear side of the operation control panel 1. Of course, it should be understood that the mechanism is also capable of being applied to other appliances that need to control the movement of the operation control panel, for example, an appliance with a water tank, such as a humidifier.

The operation control panel push-pull mechanism includes a driving part 3, a fitting part 4 and a first pushing part 5, the fitting part 4 is fixed relative to the body of the steaming-roasting electric appliance, the first pushing part 5 is rotatably connected with the driving part 3, and is fixedly connected with the operation control panel 1, a rail structure 51 is provided on the first pushing part 5, the fitting part 4 cooperates with the rail structure 51, and the driving part 3 is capable of driving the first pushing part 5 to drive the operation control panel 1 to move between the first position and the second position, and the rail structure 51 includes configured such that the operation control panel 1 exposes the water tank 2 when being in the first position and conceals the water tank 2 to the rear side of the operation control panel 1 when being in the second position. According to the disclosure, the rail structure 51 is provided on the first pushing part 5, thereby saving the space occupied by the push-pull mechanism, which enables the water tank 2 to be designed larger, reduces the number of times of water addition, reduces the length of the first pushing part 5, and ensures the movement stability of the push-pull mechanism.

Figure 5:
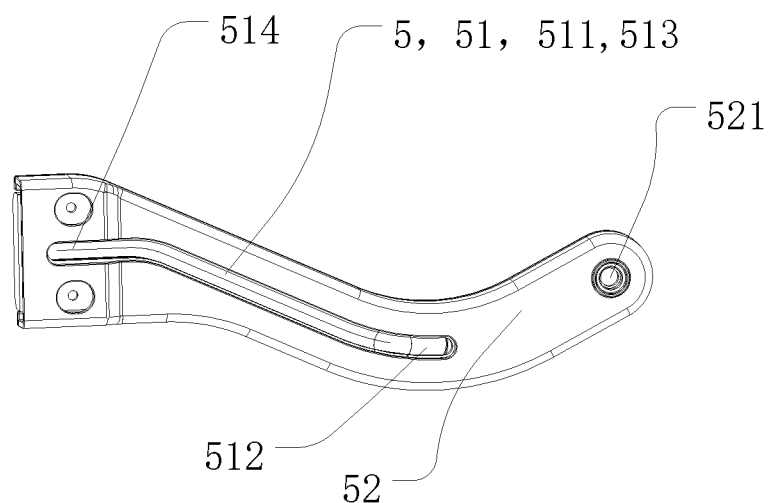
FIG. 5 is a structural schematic diagram of a first pushing part according to some embodiments of the present disclosure.

Further, the rail curve of the rail structure 51 is the movement track of the operation control panel 1; the rail structure 51 includes a circular arc section 512, an inclined section 513 and a horizontal section 514 from the rear to the front, and when the operation control panel 1 is in the second position, the inclined section inclines upwards from the rear to the front, hence, the movement track of the operation control panel 1 is such that the operation control panel 1 first performs a straight forward movement (corresponding to the horizontal section 514), then performs an obliquely upward movement (corresponding to the inclined section 513), and finally performs a turnover movement (corresponding to the circular arc section 512), so that the operation control panel 1 completely avoids the access path of the water tank 2, as shown in FIG. 5, there is a smooth transition between the sections, making the movement of the operation control panel 1 more stable.

Figure 6:
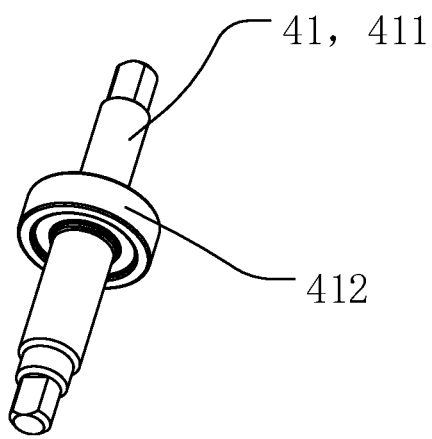
FIG. 6 is a schematic diagram of a front roller assembly according to some embodiments of the present disclosure.

Further, the rail structure 51 includes a rail groove 511, and the fitting part 4 includes a front roller assembly 41. As shown in FIG. 6, the front roller assembly 41 includes a front shaft 411 and a front bearing 412 sleeved on the front shaft 411, wherein the front bearing 412 is located in the rail groove 511 and can move along the rail groove 511. The front shaft 411 is in interference fit with the front bearing 412, so that the inner ring of the front bearing 412 and the front shaft 411 do not rotate relative to each other. The front bearing 412 is, for example, a rolling bearing, and an outer ring and an inner ring of the front bearing 412 are able to rotate relative to each other. Alternatively, the rail structure 51 is a strip-shaped protrusion structure, the fitting part 4 is a groove-shaped structure, and the strip-shaped protrusion structure is located in the groove-shaped structure, so that the groove-shaped structure is able to move relative to the strip-shaped protrusion along a track of the strip-shaped protrusion structure.

Further, the operation control panel push-pull mechanism further includes a base 6, and the front shaft is 411 fixed on the base 6, so that the front baring 412 rotates on the spot. Specifically, the front bearing 412 is located in the middle of the front shaft 411, and two ends of the front shaft 411 are capable of being fixedly connected to the base 6.

Figure 3:
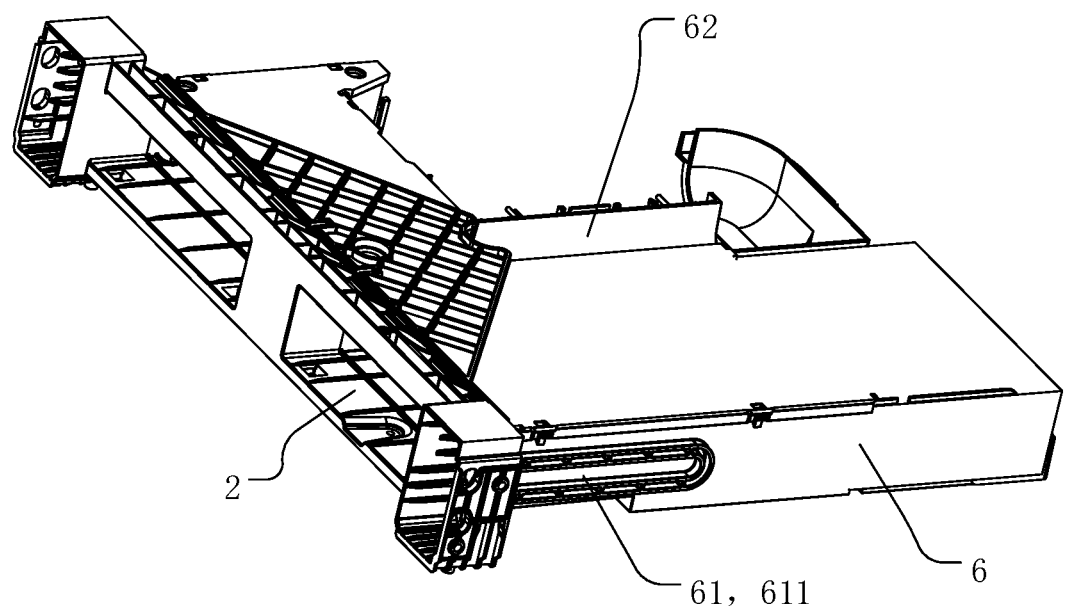
FIG. 3 is a structural schematic diagram of a base according to some embodiments of the present disclosure.

Further, the first pushing part 5 includes a push rod 52. As shown in FIG. 5, the shape of the push rod 52 is substantially the same as the shape of the rail structure 51, and includes a circular arc section 512, an inclined section 513 and a horizontal section 514 from the rear to the front, and there is a smooth transition between the sections. The rear end of the push rod 52 is rotatably connected with the driving part 3 by a rear roller assembly 7 (described in detail below), and the front end of the push rod 52 is fixedly connected with the operation control panel 1 by fasteners such as rivets, screws or bolts. As shown in FIG. 3, the base 6 is of a box-shaped structure, and the water tank 2 is accommodated in the box-shaped structure. Two push rods 52 are provided, and the two push rods 52 are respectively located on two sides of the box-shaped structure. In this way, the base 6 and the water tank 2 are integrated together, thereby further improving the compactness of the structure.

Further, as shown in FIGS. 1 and 2, the driving part 3 includes a driving device 31 and a second pushing part 32, the driving device 31 is, for example, a push rod motor, the push rod motor pushes the second pushing part 32 to make a reciprocating linear motion, the two push rods 52 are both rotatably connected with the second pushing part 32, and the driving device 31 drives the two push rods 52 move synchronously by the second pushing part 32. Of course, it should be understood that the driving device 31 also includes a rotation motor and a transmission mechanism for converting the rotation of the rotation motor into a rectilinear motion.

Specifically, the driving device 31 is installed on the base 6, an accommodating groove 62 is provided in the middle of the box-shaped structure, the accommodating groove 62 is of an elongated structure and extends to the front from the rear, and the driving device 31 is provided in the accommodating groove 62, thereby further saving a space occupied by the push-pull mechanism and providing a space for the movement of the push rod of the driving device 31.

Figure 4:
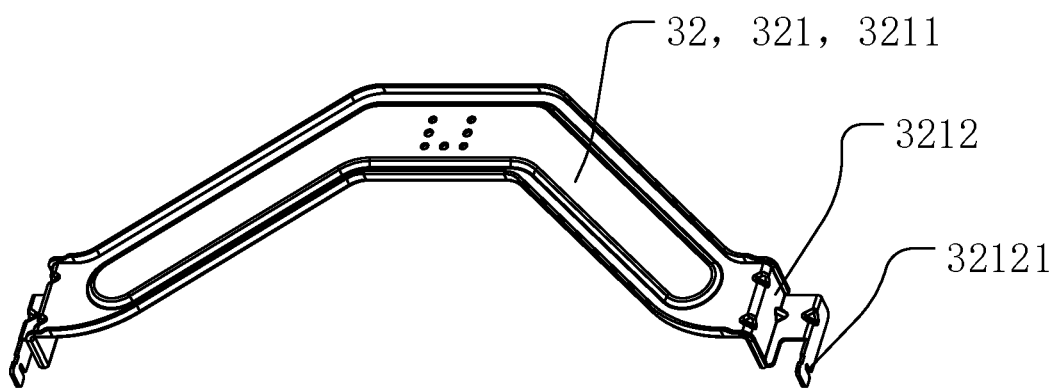
FIG. 4 is a structural schematic diagram of a second pushing part according to some embodiments of the disclosure.

Further, the second pushing part 32 includes a pushing plate 321, the pushing plate 321 includes an elongated plate part 3211 located above the box-shaped structure and two connection plate parts 3212 formed by bending two ends of the elongated plate part 3211 downwards, the two connection plate parts 3212 are located on both sides of the box-shaped structure, the elongated plate part 3211 is connected with the driving device 31, and the two connection plates 3212 are rotatably connected with the two push rods 52, respectively. The elongated plate part 3211 has a rectangular shape or any other shape. In some embodiments, as shown in FIG. 4, the elongated plate part 3211 is of a planar structure including two inclined sections and a horizontal section, the horizontal section is located between the two inclined sections, forming a trapezoid structure, the planar structure is more stable than a rectangular structure, the two inclined sections are connected with the two connection plate parts 3212, and the horizontal section is connected with the driving device 31.

Further, the base 6 is provided with a guiding structure 61 for guiding the movement of the rear end of the push rod 52. In the embodiments shown in FIGS. 1 and 2, two guiding structures 61 are provided and respectively located at two sides of the box-shaped structure, the guiding structure 61 is of a long strip shape and is able to guide the movement of the rear end of the push rod 52, so that the rear end of the push rod 52 moves in a horizontal direction.

Figure 7:
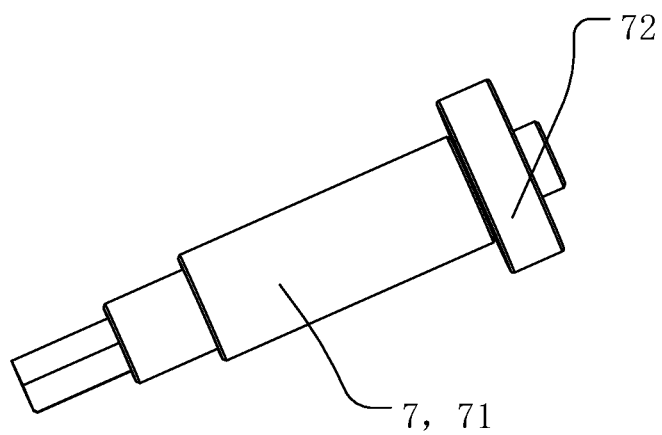
FIG. 7 is a schematic diagram of a rear roller assembly according to some embodiments of the present disclosure.
Figure 8:
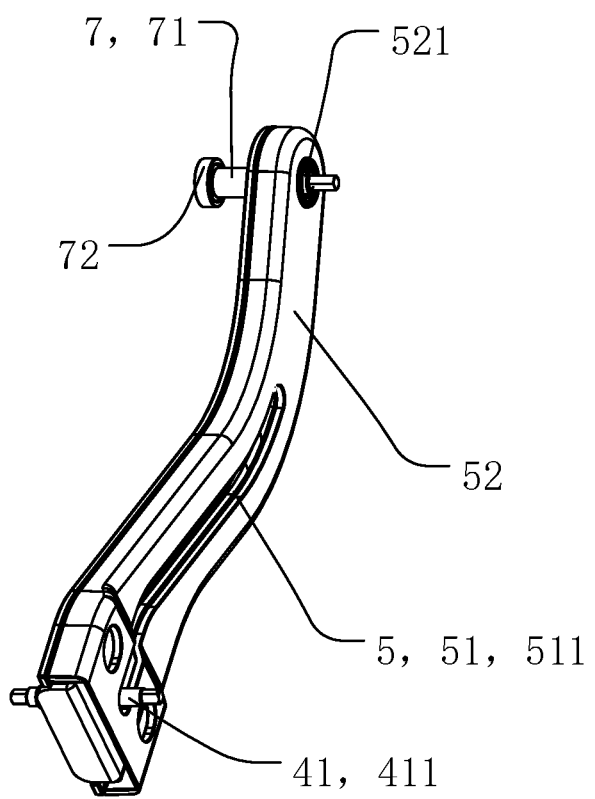
FIG. 8 is a schematic diagram of the cooperation of a fist pushing part, a front roller assembly and a rear roller assembly according to some embodiments of the present disclosure.

In some embodiments, the guiding structure 61 includes a sliding groove 611, the operation control panel push-pull mechanism further includes a rear roller assembly 7. As shown in FIG. 7, the rear roller assembly 7 includes a rear shaft 71 and a rear bearing 72 sleeved on the rear shaft 71, the rear shaft 71 is fixedly connected with a connection plate part 3212 and is rotatably connected with the rear end of the push rod 52, and the rear bearing 72 is located in the sliding groove 611 and is able to move along the sliding groove 611. The rear shaft 71 is in interference fit with the rear bearing 72, so that the inner ring of the rear bearing 72 and the rear shaft 71 do not rotate relative to each other. The rear bearing 72 is, for example, a rolling bearing, and an outer ring and an inner ring of the rear bearing 72 are able to rotate relative to each other. In some embodiments, the rear bearing 72 is located at one end of the rear shaft 71, the other end is a thread structure which is capable of being fixedly connected with the connection plate part 3212, the push rod 52 is provided with a hole 521 for the rear shaft 71 to pass through, the connection plate 3212 is provided with a groove 32121 for the rear shaft 71 to pass through, one end of the rear shaft 71 with a threaded structure first passes through the hole 521 on the push rod 52, then passes through the groove 32121 on the connection plate part 3212, and then is fixedly connected by a bolt, and the hole 521 on the push rod 52 is in clearance fit with the rear shaft 71, so that the push rod 52 is able to rotate relative to the rear shaft 71.

When water needs to be added, the user presses keys to enable the driving device 31 to work, and the second pushing part 32 is pushed to move forward; as the rear shaft 71 is fixedly connected with the connection plate part 3212, the rear bearing 72 sleeved on the rear shaft 71 moves forward along the sliding groove 611; as the rear shaft 71 is rotatably connected with the rear end of the push rod 52, the rear end of the push rod 52 also moves forward; as the front roller assembly 41 rotates on the spot, a rolling is generated between the rail structure 51 of the push rod 52 along the rail and the front bearing 412, and meanwhile, a rotation is generated between the push rod 52 and the connection plate part 3212, so that the front bearing 412 moves from the front end position of the rail groove 511 at the beginning to the rear end position of the rail groove 511 in the end, causing the operation control panel 1 to move from the second position to the first position, thereby exposing the water tank 2 to add water. After the addition of water is completed, the driving device 31 drives the second driving part 32 to move backwards, and meanwhile the rear bearing 72 moves backwards along the sliding groove 611 to drive the rear end of the push rod 52 to move backwards, and finally the operation control panel 1 returns to the second position to hide the water tank 2 to the rear side of the operation control panel 1.

Figure 9:
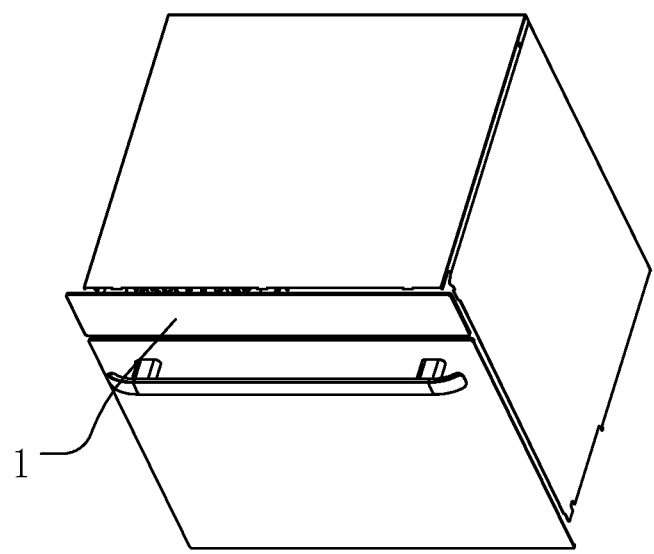
FIG. 9 is a structural schematic diagram of a steaming-roasting electric appliance according to some embodiments of the present disclosure.

Some embodiments of the disclosure also provide a steaming-roasting electric appliance, as shown in FIG. 9, including the above operation control panel push-pull mechanism. The steaming-roasting electronic appliance includes a steamer, or a roaster with steaming and roasting functions or a steam oven.

Those skilled in the art can easily understand that the preferred solutions above can be freely combined and superposed when no conflict is caused.

The embodiments of the present disclosure are intended to illustrate but not limit the present disclosure. To those skilled in the art, various modifications and variations are available for the present disclosure. Any modification, equivalent substitution, and improvement within the spirit and principle of the present disclosure should be covered in the scope of protection of the present disclosure.

What is claimed is:

1. An operation control panel push-pull mechanism, which is capable of driving an operation control panel of an electric appliance to move between a first position and a second position, wherein the operation control panel push-pull mechanism comprises a driving part, a fitting part and a first pushing part, the fitting part rotating relative to a body of the electric appliance, the first pushing part being rotatably connected with the driving part, the first pushing part being fixedly connected with the operation control panel, wherein the first pushing part comprises a rail structure, the fitting part cooperating with the rail structure, and the driving part being capable of driving the first pushing part to drive the operation control panel to move between the first position and the second position, the first pushing part and the operation control panel move together;

the rail structure comprises a circular arc section, an inclined section and a horizontal section from a rear of the rail structure to a front of the rail structure, and when the operation control panel is in the second position, the inclined section inclines upwards from the rear of the rail structure to the front of the rail structure;

wherein the rail structure comprises a rail groove, the fitting part comprising a front roller assembly, the front roller assembly comprising a front shaft and a front bearing sleeved on the front shaft, and the front bearing is located in the rail groove and is able to move along the rail groove, the operation control panel push-pull mechanism further comprises a base, and the front shaft is fixed on the base;

the driving part comprises a driving device and a second pushing part, the driving device comprises a rotation motor, wherein the base comprises a guiding structure provided with a sliding groove.

2. A steaming-roasting electronic appliance, comprising a water tank, and the operation control panel and the operation control panel push-pull mechanism as claimed in claim 1, wherein the operation control panel exposes the water tank when being in the first position and conceals the water tank to a rear side of the operation control panel when being in the second position.

3. The steaming-roasting electronic appliance as claimed in claim 2, wherein the steaming-roasting electronic appliance comprises a steamer, or a roaster with steaming and roasting functions or a steam oven.

4. The operation control panel push-pull mechanism as claimed in claim 1, wherein the first pushing part comprises a push rod, a rear end of the push rod is rotatably connected with the driving part, and a front end of the push rod is fixedly connected with the operation control panel.

5. The operation control panel push-pull mechanism as claimed in claim 4, wherein the base is of a box-shaped structure, and a water tank being accommodated in the box-shaped structure.

6. The operation control panel push-pull mechanism as claimed in claim 5, wherein the push rod comprising two push rods are provided, and the two push rods are respectively located on two sides of the box-shaped structure.

7. The operation control panel push-pull mechanism as claimed in claim 6, wherein the two push rods are both rotatably connected with the second pushing part, and the driving device drives the two push rods to move synchronously by the second pushing part.

8. The operation control panel push-pull mechanism as claimed in claim 7, wherein the driving device is installed on the base.

9. The operation control panel push-pull mechanism as claimed in claim 8, wherein an accommodating groove is provided in a middle of the box-shaped structure, and the driving device is provided in the accommodating groove.

10. The operation control panel push-pull mechanism as claimed in claim 7, wherein the second pushing part comprises a pushing plate, and the pushing plate comprises an elongated plate part located above the box-shaped structure and two connection plate parts formed by bending two ends of the elongated plate part downwards, wherein the elongated plate part is connected with the driving device, and the two connection plate parts are rotatably connected with the two push rods respectively.

11. The operation control panel push-pull mechanism as claimed in claim 7, wherein the guiding structure is provided on the base for guiding a movement of the rear end of the push rod.

12. The operation control panel push-pull mechanism as claimed in claim 5, wherein the guiding structure is provided on the base for guiding a movement of the rear end of the push rod.

13. The operation control panel push-pull mechanism as claimed in claim 4, wherein the guiding structure is provided on the base for guiding a movement of the rear end of the push rod.

14. The operation control panel push-pull mechanism as claimed in claim 13, wherein the operation control panel push-pull mechanism further comprises a rear roller assembly, the rear roller assembly comprising a rear shaft and a rear bearing sleeved on the rear shaft, wherein the rear shaft is fixedly connected with the driving part and rotatably connected with the rear end of the push rod, and the rear bearing is located in the sliding groove and is able to move along the sliding groove.

* * * * *